E. W. N. BOOSEY.
WASTE TRAP.
APPLICATION FILED DEC. 31, 1915.

1,245,558.

Patented Nov. 6, 1917.

Inventor
EDWARD W. N. BOOSEY.

Witness
Emerick Wiener.

By Charles E. Wiener
Attorney

UNITED STATES PATENT OFFICE.

EDWARD W. N. BOOSEY, OF DETROIT, MICHIGAN.

WASTE-TRAP.

1,245,558.      Specification of Letters Patent.      Patented Nov. 6, 1917.

Application filed December 31, 1915. Serial No. 69,550.

*To all whom it may concern:*

Be it known that I, EDWARD W. N. BOOSEY, a citizen of the United States, residing at Detroit, county of Wayne, State of Michigan, have invented a certain new and useful Improvement in Waste-Traps, and declare the following to be a full, clear, and exact description of the same, such as will enable others skilled in the art to which it pertains to make and use the same, reference being had to the accompanying drawings, which form a part of this specification.

This invention relates to waste traps adapted for use with wash-basins, sinks, etc., of a form and internal construction to allow foreign matter to pass freely therethrough and so arranged as to be secured to both the inlet and outlet pipes irrespective of their position radially thereabout. The trap is formed of two parts, one part being adapted to be connected to an inlet pipe and the other part to an outlet pipe, and the two parts are so connected as to allow them to be turned relatively one to the other so that the position of the inlet and outlet connections may be altered to agree with the positions of the inlet and outlet pipes respectively, and thus avoid the necessity of making undesirable bends in the said connections. Another object of the invention is a trap embodying the above named characteristics that is cylindrical in form and in which the water flowing into the inlet at the bottom of the trap is given a whirling motion, which tends to keep the interior of the trap clear of foreign matter, and provision is made at the outlet end of the trap to break up the uniformity of such whirling movement of the water prior to its discharge to prevent siphoning of the trap due to suction caused by the water.

An additional object of the invention is a trap cylindrical in form of two parts secured together by a coupling ring adapted to pass over one of said parts and to screw onto the threaded end of the other of said parts. The first named part is provided with an internal threaded hub for receiving the pipe connection whereby there is no portion projecting exteriorly of the cylindrical outer surface. These and other objects and novel features of the invention are hereinafter more fully described and claimed and shown in the accompanying drawings in which—

Similar characters refer to similar parts throughout the drawing and specification.

Figure 1:
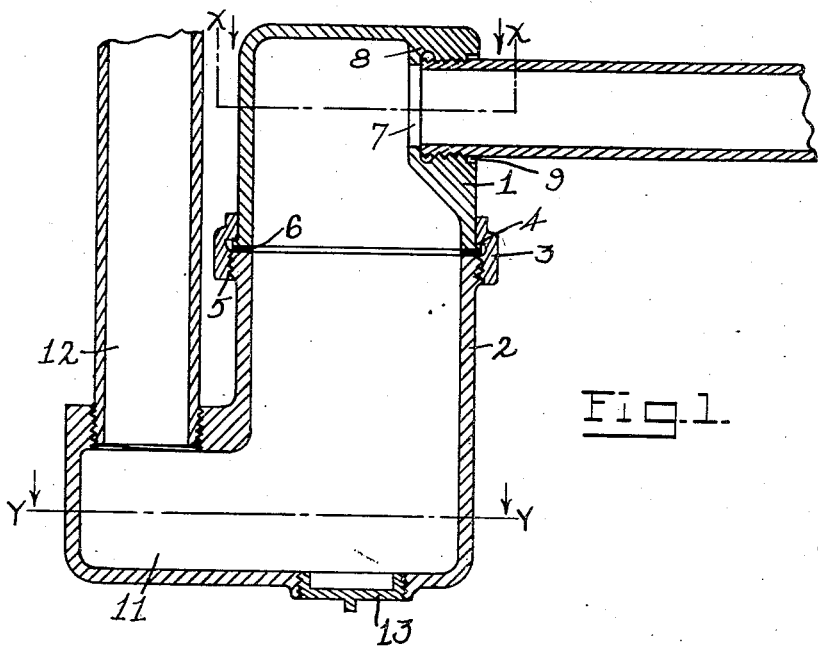
Figure 1 is a vertical section of a trap embodying my invention.

The trap consists of two cylindrical parts 1 and 2 secured together in axial alinement by a coupling ring 3. The part 1 at the open end thereof is provided with a shoulder 4 engaged by a similar formed part on the ring 3, and the part 2 of the trap terminates at the open end thereof with a threaded shoulder 5 with which the threaded part of the ring 3 engages as indicated in Fig. 1. A gasket 6 is placed between the abutting ends of the two parts and by tightening the coupling 3 the gasket is tightly compressed and leakage prevented.

Figure 2:
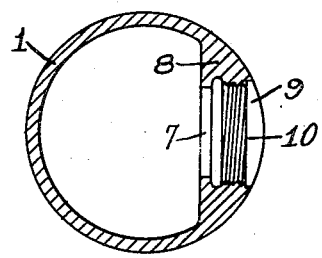
Fig. 2 is a section taken on line $x$—$x$ of Fig. 1, showing the internal hub forming an obstruction in the path of movement of the water flowing through the trap.
Figure 3:
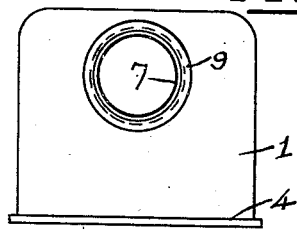
Fig. 3 is an elevation of the discharge end of the trap showing the internal threaded hub.

The upper part of the cylindrical member 1 is provided with an outlet 7 threaded to receive the outlet pipe. Usually in providing a pipe connection to a cylindrical part, a threaded hub extending outwardly from the outer surface of the part is provided. In such construction, however, the ring 3, which is circular in form and quite closely engages the outer surface of the cylindrical member, could not be placed over the member to position on the shoulder 4. With the construction here shown, the wall of the member is made much thicker to form a hub 8 on the interior thereof as indicated in Figs. 1 and 2, providing ample length of thread to make a proper pipe connection therewith, and leaving the external surface of the member 1 entirely free of projecting parts. By thus constructing the part 1, the ring 3 may be readily passed thereover onto the shoulder 4. Preferably the external face of the member 1 is recessed slightly at 9 as indicated in Figs. 2 and 3, having a diameter slightly greater than the outer diameter of the pipe. The purpose of this recess is to provide a flat surface 10 indicated in Fig. 2, in which to start the threads, and the pipe is thus easily threaded in the aperture and avoids the difficulties involved in starting the threads at the surface of the circular face of the member.

Figure 4:
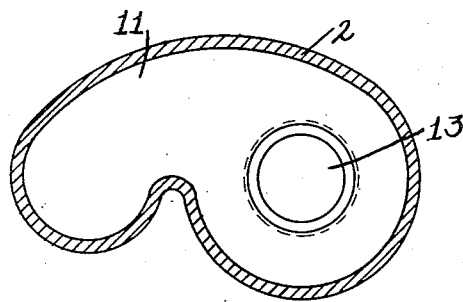
Fig. 4 is a section taken on line $y$—$y$ of Fig. 1.

The portion 2 of the body is provided with an inlet channel 11 opening thereinto at the bottom as indicated in Figs. 1 and 4, the arrangement being such that water flowing into the member 2 is given a whirling motion in the seal chamber as is commonly the practice in other devices of this nature. The channel 11 extends outwardly from the side of the member 2 and the upper wall thereof is provided with a threaded aperture to receive the inlet pipe 12 as indicated in Fig. 1. The member 2 is preferably provided with a "clean-out" aperture closed by the plug 13. The plug is preferably in the center of the bottom of the member 2 but may be otherwise positioned as may be desired.

With material flowing into the trap and given a whirling motion as described, the walls of the trap are kept practically free from accumulation of foreign matter. As with other traps formed with a like inlet, this whirling movement of the water, while desirable by reason of the cleaning effect mentioned, oftentimes produces so great a suction at the outlet as to siphon the trap and thus break the water seal provided for by placing the outlet above the inlet. In the construction here shown this detrimental effect is avoided by interposing an obstruction at the outlet in the path of movement of the whirling fluid body. This function is accomplished by the inwardly projecting portion 8 having the threaded aperture to receive the outlet pipe. By such arrangement, as may be understood from Fig. 3, the water in following the circular wall of the chamber will at the point of outlet impinge against the surface of the portion 8 and be deflected toward the center of the chamber into what may be termed the core of the vortex and thus destroys the whirling motion of the mass at the point of delivery to the outlet. By this breaking up of the uniform whirling movement of the mass, the vacuum produced by such movement is destroyed and the trap, therefore, can not be siphoned from such cause.

By forming a trap of two parts as indicated, one may be turned relative to the other to enable direct connections to be made with inlet and outlet pipes in whatever position the same may be placed radially about the trap and the necessity for making bends in such connections is thus avoided. Also by forming the upper member 1 without projecting hubs or portions on the external surface thereof the ring 3 may be readily passed thereover without the necessity of forming the ring and the abutting ends of the two members 1 and 2 of a diameter greatly in excess of the diameter of the external wall of the said members.

Having thus briefly described my invention, and its utility, what I claim and desire to secure by Letters Patent of the United States is—

1. A trap comprising two separable parts providing a seal chamber, one of said parts having an inlet of such form and arrangement that inflowing fluid is given a whirling motion in the chamber and being threaded at the end for connection with the other part, said other part being cylindrical in exterior form and free from outwardly projecting parts and having an internally projecting portion providing a hub threaded to receive the outlet piping in the side thereof at substantially a right angle to the longitudinal axis of the part, said part having a circumferential flange, and a coupling ring adapted to pass over the said part engaging the said circumferential flange and threaded to engage the threaded end of the other part.

2. A trap comprising two parts adapted to be secured together, one of said parts being adapted for connection with the inlet piping, and the other of said parts being substantially cylindrical in form and free from externally projecting parts and having an aperture in the side wall thereof threaded to receive the outlet piping at substantially a right angle to the longitudinal axis of the part, said part having a circumferential flange at the end and the other part having a threaded end, and a threaded coupling ring adapted to pass over the flanged part to connect the two parts together.

3. A trap comprising two substantially cylindrical parts providing a seal chamber one of said parts having an inlet of such form and arrangement that inflowing liquid is given a whirling motion in the chamber, the other of said parts being cylindrical in exterior form free from projecting parts on the outer surface and having an internally projecting portion integrally formed therewith at the upper end provided with a threaded aperture opening through the side wall of the said part to receive the outlet piping at substantially a right angle to the longitudinal axis of the part, and a coupling ring adapted to pass over the said part to detachably secure the two parts together.

4. A trap formed of two cylindrical parts, one of said parts being arranged for connection with an inlet pipe and the other of said parts being arranged for connection with an outlet pipe, the connection for the piping in one of said parts being formed by an internally projecting hub portion threaded to receive the piping at substantially a right angle to the longitudinal axis of the part, the external surface of said part being cylindrical and free from projecting portions, a threaded coupling ring adapted to pass over the said part, an annular chamber on the open end of said part engaged by a corresponding part of the ring, the other of said parts having a threaded end engaged by the threaded portion of the ring to maintain the two parts together and allowing the said parts to be turned about their common axis.

5. A trap formed of two cylindrical parts, one of said parts adapted for connection with the inlet piping and the other of said parts being adapted for connection with the outlet piping, the inlet being so arranged that inflowing fluid is given a whirling motion within the chamber formed by the two united parts, the outlet pipe being connected to its part in the side thereof at a right angle to the longitudinal axis of the part, the said part having an internally projecting portion provided with a threaded aperture to receive the outlet piping, the said internally projecting portion providing an obstruction to the uniformity of movement of fluid therein to break the vortex prior to its discharge into the outlet, the portion provided with an outlet being cylindrical in exterior form, and a coupling ring adapted to pass over the said part adapted to connect the two parts of the trap together.

In testimony whereof, I sign this specification.

EDWARD W. N. BOOSEY.